United States Patent [19]

Kervagoret

[11] Patent Number: 5,588,463
[45] Date of Patent: Dec. 31, 1996

[54] MODULE FOR CONTROLLING PRESSURE IN A HYDRAULIC CIRCUIT

[75] Inventor: Gilbert Kervagoret, Argenteuil, France

[73] Assignee: AlliedSignal Europe Services Technique, Drancy, France

[21] Appl. No.: 325,199

[22] PCT Filed: Oct. 4, 1994

[86] PCT No.: PCT/FR94/01151

§ 371 Date: Oct. 20, 1994

§ 102(e) Date: Oct. 20, 1994

[87] PCT Pub. No.: WO95/12155

PCT Pub. Date: May 4, 1995

[30] Foreign Application Priority Data

Oct. 29, 1993 [FR] France ..................... 93 12912

[51] Int. Cl.$^6$ .............................................. F15B 13/044
[52] U.S. Cl. ................. 137/596.15; 91/448; 137/596.16; 137/596.17; 303/119.2
[58] Field of Search .................. 91/448; 137/596.15, 137/596.16, 596.17; 303/119.2

[56] References Cited

U.S. PATENT DOCUMENTS 4,741,364  5/1988  Stoss et al. ..................... 137/625.64
5,191,827  3/1993  Kervagoret ..................... 137/596.17 X

*Primary Examiner*—Gerald A. Michalsky
*Attorney, Agent, or Firm*—Leo H. McCormick, Jr.

[57] ABSTRACT

A module for controlling pressure in a hydraulic circuit, comprising at least one generator of pressurized fluid, at least one reservoir of low pressure fluid, and at least one pressure receiver. The module including a solenoid valve having an electric coil and a movable magnetic core plunger. The plunger being moved to controlling a position of a distributor slide valve which slides in a bore formed in a body. The bore communicating with a feed passage connected to the generator of pressurized fluid, a distribution passage connected to the pressure receiver, and a pressure relief passage connected to said reservoir of low pressure fluid. The module having a pressure controlled valve located between the generator and the feed passage. The pressure controlled valve being switched into an opened position when the core plunger actuates the distributor slide valve such that pressurized fluid is directly communicated to the feed passage from the generator for communication to distribution passage for transmission to the pressure receiver.

9 Claims, 1 Drawing Sheet

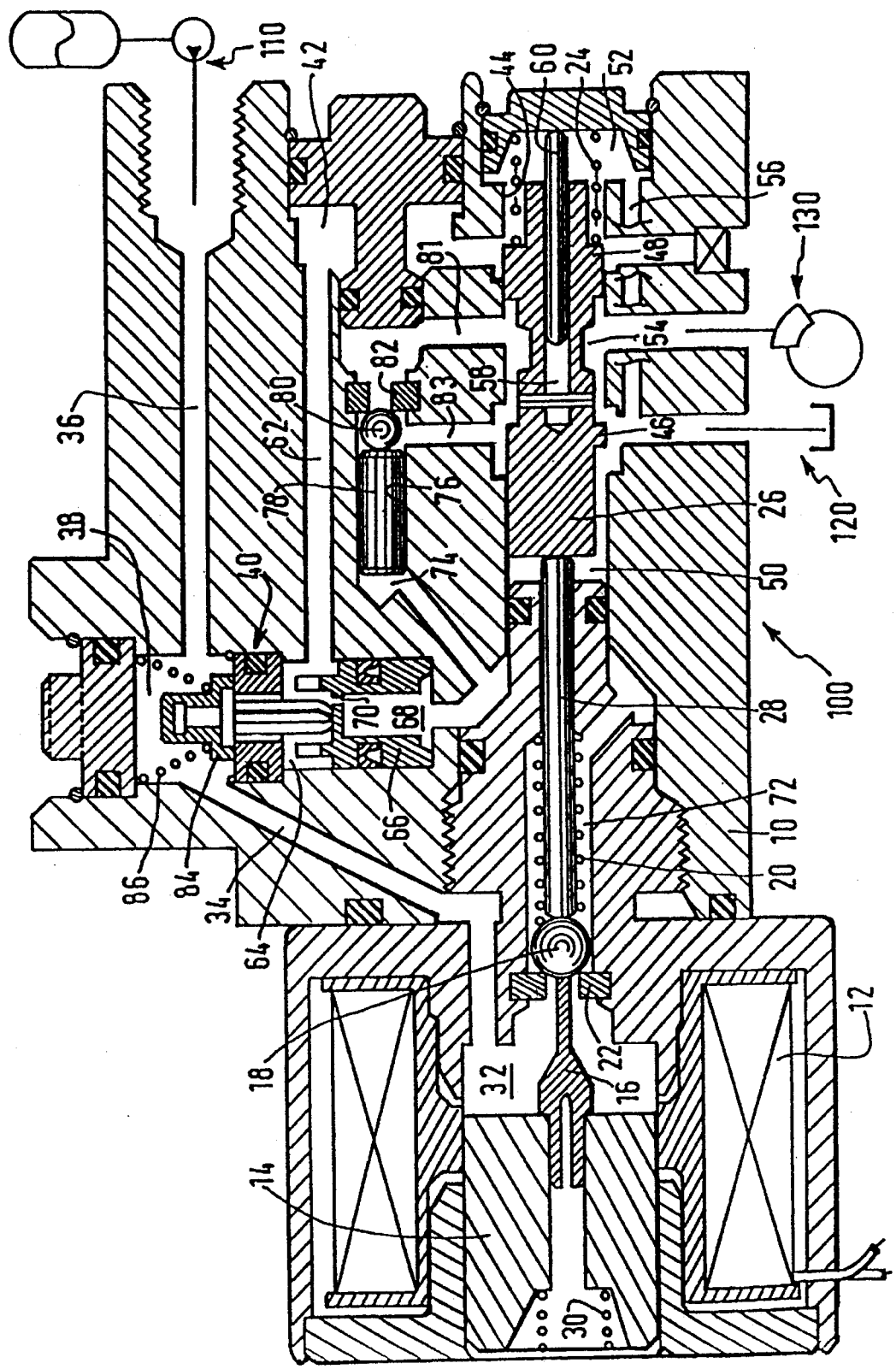

MODULE FOR CONTROLLING PRESSURE IN A HYDRAULIC CIRCUIT

The present invention is in the field of systems for controlling and regulating the pressure in hydraulic circuits, and relates more particularly to a module which can be used in such systems.

In the majority of hydraulic installations, it is necessary to cause the hydraulic pressure to vary in a pressure receiver device, in response to a control signal. The pressure receiver may consist, for example, of a hydraulic cylinder actuator or of a hydraulic motor, and the control signal may, for example, be mechanical, hydraulic or electrical.

Documents EP-A-0,369,412 and GB-A-2,215,416 describe such modules for controlling hydraulic pressure, in which the pressure receiver is a motor vehicle brake motor and the control signal is electrical. These systems exhibit the major drawback of a very high electrical consumption.

Document EP-A-0,452,173 has proposed a module for controlling pressure in a hydraulic circuit, comprising a generator of pressurized fluid, a reservoir of low pressure fluid, and a pressure receiver, the module including a solenoid valve including an electric coil and a movable magnetic core plunger controlling the position of a distributor slide valve sliding in a bore formed in a body, the bore communicating with a feed passage connected to the generator of pressurized fluid, a distribution passage connected to the pressure receiver, and a pressure relief passage connected to the reservoir of low pressure fluid, the slide valve comprising a hydraulic enclosure determining a reaction force which opposes the force generated by the coil, and the distribution passage being placed in communication, selectively, with the feed passage or with the pressure relief passage by the distributor slide valve.

Such a module, by virtue of the use of a proportional solenoid valve and of a hydraulic reaction enclosure, makes it possible to reduce considerably the electrical power consumption of the solenoid valve of the control module. However, this module is unsuitable for some applications such as high volume hydraulic circuits for example, in which the module must control high flow rates of fluid of high pressure. In the application example mentioned above, such a case arises when the module controls the hydraulic braking of a utility vehicle.

Consequently, the object of the present invention is to propose a module for controlling the pressure in a hydraulic circuit, the electrical power consumption of which is as small as possible, which can provide high flow rates of fluid at a high pressure, and the operation of which is reliable, the design of this module moreover being simplified so as to obtain a low cost.

This object is achieved, according to the invention, by arranging a controlled valve delivering the pressurized fluid coming from the generator into the feed passage when the movable magnetic core plunger actuates the distributor slide valve.

Other objects, characteristics and advantages of the present invention will emerge from the description which will now be given of one exemplary embodiment given without limitation and with reference to the appended drawing in which:

the single figure represents, diagrammatically and in section, one embodiment of a control module in accordance with the present invention.

The figure shows a diagrammatic section of a control module, denoted overall by the reference 100, arranged in a hydraulic circuit comprising a generator of pressurized fluid 110, a reservoir of low pressure fluid 120, and a pressure receiver 130.

The module 100 consists of a body 10 on which is fixed in leaktight fashion a coil 12 of a proportional-type solenoid valve. It is known that the coil of solenoid valves of this type has the essential feature of being capable of providing a substantially constant force for a given current in a not inconsiderable range of displacement of the magnetic core plunger, of the order for example of 2 to 3 mm. This feature is put to good use in the present invention to fulfil the required function by modulating the current flowing in the coil 12.

The coil 12 interacts with a movable magnetic core plunger 14 equipped with a push rod 16 for opening or closing a ball valve 18, normally closed at rest under the action of a spring 20 and in leaktight bearing against a valve seat 22.

The ball valve 18 is, on the other hand, also urged into the closed rest position by a second spring 24 bearing on a distributor slide valve 26, itself bearing on a rod 28 bearing on the ball 18. The slide valve 26 is thus always in contact with the rod 28.

The core plunger 14 and the push rod 16 are moreover urged towards the ball 18, in the direction of opening of the ball valve 18, by a spring 30, so that the push rod 16 is always in contact with the ball 18.

When the ball 18 is resting on its seat 22, it delimits around the push rod 16 an enclosure 32 permanently communicating with the generator of pressure 110 via a circuit comprising passages 34 and 36 and a chamber 38 of a controlled valve denoted overall by the reference 40.

The prestress of the spring 20 at rest is greater than the prestress of the spring 30 at rest increased by the force generated by the maximum pressure of the generator 110 acting on the surface of the ball 18 delimited by the seat 22. In this way, it is ensured that the ball valve 18 is always closed at rest, regardless of the pressure delivered by the generator 110.

The distributor slide valve 26 is designed to open or close a communication between the pressure receiver 130, the reservoir 120, and a chamber 42 formed in the body 10 in accordance with the hydraulic pressure regulating systems usually used. To do this, the slide valve 26 slides in a bore 44 of the body 10 and includes two bearing surfaces 46 and 48 delimiting, in the bore 44, three volumes, 50 and 52 on either side of the slide valve 26 and 54 between the two bearing surfaces.

The volumes 50 and 52 permanently communicate with one another, by virtue of a passage 56, and with the low pressure reservoir 120. The volume 54 permanently communicates with the pressure receiver 130 and with a blind bore 58 formed axially in the slide valve 26, constituting a reaction chamber creating a reaction force which opposes the force acting on the core plunger 14 as will be seen later. This blind bore is closed in substantially leaktight fashion by a needle 60 bearing on the body 10.

The chamber 42 communicates via a passage 62 with a second chamber 64 of the valve 40 which is controlled by a piston 66 separating the second chamber 64 from a control chamber 68, but having a flow restrictor 70 between these two chambers 64 and 68.

The chamber 68 communicates with the space 72 located around the rod 28 and comprising the spring 20, this space being capable of being placed in communication with the enclosure 32 when the ball valve 18 is opened, and also communicates with a chamber 74 formed in a bore 76 of the body 10.

The chamber 74 is delimited by a piston 78 sliding in the bore 76 and capable of urging a ball 80 against a seat 82 to open or close the communication between a passage 81 connected to the pressure receiver 130 and a passage 83 connected to the low pressure reservoir 120.

The control module which has just been described operates in the following way.

At rest, all the elements occupy the position represented in the figure, and the pressure generated by the pressure generator 110 is present in the passages 36 and 34, and in the chambers 38 and 32. In the chamber 38, this pressure confirms the closure of a valve element 84 of the controlled valve 40, which element is already subjected to the action of a spring 86. In the chamber 32 it has been seen that this pressure is insufficient to open the ball valve 18. All the other volumes and passages described above of the body 10 are therefore at the pressure of the low pressure reservoir 120, and in particular the pressure receiver 130.

When the coil 12 is fed by a current of sufficient intensity running through it, it generates a force acting on the core plunger 14 and the push rod 16, and therefore on the ball 18. When this force is sufficient to overcome the sum of the prestresses of the springs 20 and 24, the ball 18 leaves its seat 22, and the pressure from the generator 110 is set up in the space 72, in the chamber 74, thus causing the valve element 80 to close onto its seat 82 through the use of the piston 78, and in the chamber 68, thus causing the piston 66 to be displaced, which lifts the valve element 84.

The pressure in the chamber 38 can therefore be transmitted to the chamber 42 by the passage 62.

The opening movement of the valve element 18 has, on the other hand, been transmitted by the rod 28 to the slide valve 26. It is seen that the rod 28 slides in leaktight fashion in the body 10 to provide separation between the volume 50, permanently at the low pressure of the reservoir 120, and the space 72 in which the high pressure from the generator 110 now prevails. So as not to introduce any discontinuity in the present forces, the rod 28 could advantageously be given a diameter equal to that of the valve seat 22.

In a first phase of the displacement of the slide valve 26, brought about by the opening of the valve 18, the bearing surface 48 of the slide valve 26 is displaced and interrupts the communication between the chamber 42 and the chamber 52, and the bearing surface 46 is correspondingly displaced and interrupts the communication between the volume 54 and the passageway 83. The volume 54, permanently connected to the pressure receiver 130, is therefore isolated in this way from the volumes 50 and 52, which are permanently connected to the low pressure reservoir 120.

In a second phase, the increasing current in the coil 12 leads to a supplementary displacement of the slide valve 26, causing the bearing surface 48 to be displaced, which then places the chamber 42 in communication with the volume 54 and therefore with the pressure receiver 130. There is then a rise in pressure in the receiver 130 and, simultaneously, in the reaction chamber 58, this pressure creating a reaction force opposing the displacement of the slide valve 26.

In a third operating phase, if the current flowing in the coil 12 is decreased, the force acting on the slide valve 26 is diminished. Since the slide valve is now subjected to the force exerted by the spring 24 and to the hydraulic reaction in the chamber 58, it is displaced such that the bearing surface 48 interrupts the communication between the chamber 42 and the volume 54, then such that the bearing surface 46 opens the communication between the volume 54 and the passage 83, thus allowing the pressure in the receiver 130 as well as in the reaction chamber 58 to be relieved.

It is therefore seen that by modulating, for example by chopping, the current flowing in the coil 12, the slide valve 26 will assume a position which is a function of the pressure prevailing in the chamber 58, representing the pressure prevailing in the pressure receiver 130. Thus the hydraulic pressure in the receiver 130 can be slaved to the control current flowing in the coil 12.

In addition, the control module of the invention makes it possible to provide relatively high flow rates of fluid towards the receiver 130. Indeed, at the same time as the coil 12 controls the position of the slide valve 26, and as has been seen, the pressure in the receiver 130, it releases the pressure from the generator 110 into the space 72 and into the chamber 68 to control the valve element 84 of the valve 40, which in turn releases the pressure from the generator 110 into the chamber 42.

The controlled valve 40 therefore acts as a flow rate amplifier stage for the slide valve 26 acting as a pressure modulating stage. Such a separation of the flow rate and pressure functions makes it possible to obtain the required high flow rates.

In contrast, when very high pressures are reached in the receiver 130, that is to say pressures close to the pressure provided by pressure generator 110, the pressures in the chambers 68 and 64 are also close to one another, and their difference may no longer be sufficient to overcome the force of the spring 86. In such a case, the valve 84 closes again. However, a flow rate of fluid towards the receiver 130 remains possible, through the use of the flow restrictor 70, between the space 72 connected, at this moment, to the generator 110, and the chamber 42 which is connected to the receiver 130.

In the operating phases which were described above, the valve 80 remains closed because the piston 78 presents, in the chamber 74, a surface area which is greater than that of the ball 80 delimited by the seat 82 in the passage 81, and which ball is, moreover, exposed to a higher pressure.

When it is desired no longer to cause the pressure receiver 130 to operate, the electrical supply to the coil 12 is interrupted. The core plunger 14 and the push rod 16 then return to their rest position, allowing the valve 18 to close under the action of the springs 22 and 24, and allowing the space 72 to be isolated with respect to the source of pressure 110. The slide valve 26 also resumes its rest position represented in the figure.

Any pressure prevailing in the pressure receiver 130 can thus decrease by placing the volume 54 in communication with the passage 83 connected to the low pressure reservoir 120. The pressure in the space 72 also decreases because this space communicates with the reservoir 120 via the chamber 68, the restrictor 70, the chamber 64, the passage 62, the chamber 42, the volume 52 and the passage 56.

Assuming that the slide valve 26 were to remain blocked or "stuck" in the position corresponding to the second phase described above, any residual pressure in the receiver 130 can nevertheless be eliminated.

Indeed, this residual pressure is then present in the passage 81 and is exerted on the surface of the ball 80 delimited by the seat 82. This residual pressure is also present in the chamber 42, the passage 62 and the chamber 64. In contrast, when the valve 18 is closed, the latter allows the pressure coming from the generator 110 to remain in the space 72. This pressure is also present in the chambers 68 and 74. In this assumption of the slide valve 26 being blocked, the valve 18 is closed by virtue of the choice of prestress of the spring 20, as explained above.

The chambers 68 and 64 communicate with one another through the use of the flow restrictor 70, and since the pressure in the chamber 68 is greater than the pressure in the chamber 64, the flow restrictor 70 allows a decrease in pressure in the chamber 68. This decrease in pressure also occurs in the chamber 74, which results in a decrease in the force applied to the ball 80 by the piston 78.

The ball 80 may then rise from its seat 82, thus placing the passages 81 and 83 in communication, and consequently placing the pressure receiver 130 and the low pressure reservoir 120 in communication. Any residual pressure in the pressure receiver 130 is thus eliminated.

Thus a control module generating a hydraulic pressure which is proportional to the electrical control current has indeed been produced. Moreover, this module does not have any operating threshold. Indeed, it has been seen that in the rest position, that is to say in the absence of any electrical control current, the slide valve 26 is subjected solely to the pressure from the low pressure reservoir 120. Any risk of this slide valve "sticking" upon start up is thus avoided. The module, owing to its two-stage design, allows high fluid flow rates at a high pressure, one stage controlling the pressure whereas the other controls the flow rate. Its operation is reliable because, regardless of the circumstances, if no current flows in the coil 12, no pressure is transmitted to the receiver 130. Finally, manufacture is relatively simplified because the slide valve 26 is the only component to require accurate machining.

I claim:

1. A module for controlling pressure in a hydraulic circuit, comprising at least one generator of pressurized fluid, at least one reservoir of low pressure fluid, and at least one pressure receiver, said module including a solenoid valve having an electric coil and a movable magnetic core plunger, said plunger on moving controlling a position of a distributor slide valve which slides in a bore formed in a body, said bore communicating with a feed passage connected to said generator of pressurized fluid, a distribution passage connected to said pressure receiver, and a pressure relief passage connected to said reservoir of low pressure fluid, said module being characterized by a pressure controlled valve located between said generator and said feed passage, said pressure controlled valve being switched into an opened position when said core plunger actuates the distributor slide valve such that pressurized fluid is directly communicated to said feed passage for communication to distribution passage for transmission to said pressure receiver.

2. The control module according to claim 1, characterized in that the controlled valve includes a control chamber and a second chamber communicating with said feed passage.

3. The control module according to claim 2, characterized in that the control chamber and the second chamber are delimited by a piston.

4. The control module according to claim 3, characterized in that said movable magnetic core plunger acts on the distributor slide valve through the use of a mechanically operated valve interacting with a seat for controlling it communication between said generator of pressurized fluid and said control chamber of the controlled valve.

5. The control module according to claim 4, characterized in that said mechanically operated valve is subjected to a return force exerted by at least one spring, said spring of which the prestress at rest is greater than the force exerted by the pressurized fluid from said generator on the surface of said valve delimited by the seat.

6. The control module according to claim 3, characterized in that said piston includes a flow restrictor located between said control chamber and said second chamber.

7. The control module according to claim 1, characterized by further including a communication passage between said pressure receiver and the low pressure reservoir, a ball valve located in said communication passage which interacts with a seat and is controlled by a piston for allowing residual pressure in said distribution passage to be communicated to said reservoir.

8. The control module according to claim 7 characterized in that said piston delimits a chamber communicating with a said control chamber of said pressure controlled valve.

9. The control module according to claim 1, characterized in that said slide valve includes a reaction chamber which is closed in substantially leaktight fashion by a needle member which bears on the body.

* * * * *